United States Patent [19]

Stephens et al.

[11] Patent Number: 5,206,486

[45] Date of Patent: Apr. 27, 1993

[54] DATA RECORDER AND STYLUS THEREFOR

[75] Inventors: Richard J. Stephens, Escondido, Calif.; Harry H. Boucher, Dallas, Tex.

[73] Assignee: Election Data Corporation, St. Charles, Ill.

[21] Appl. No.: 678,896

[22] Filed: Mar. 28, 1991

Related U.S. Application Data

[63] Continuation of Ser. No. 387,519, Jul. 28, 1989, abandoned.

[51] Int. Cl.⁵ ............................................... G07C 13/00
[52] U.S. Cl. ................................. 235/51; 235/50 R; 235/52
[58] Field of Search ............................ 235/50 R–51, 235/93, 103, 104, 52

[56] References Cited

U.S. PATENT DOCUMENTS

| | | |
|---|---|---|
| D. 226,138 | 1/1973 | Fleming . |
| 1,613,766 | 1/1927 | Parcher . |
| 2,923,452 | 2/1960 | Holovka, Jr. . |
| 2,949,292 | 8/1960 | Abissi . |
| 3,007,620 | 11/1961 | LaFramboise et al. ............ 225/93 |
| 3,178,107 | 4/1965 | Fagan ................................ 235/56 |
| 3,201,038 | 8/1965 | Harris ............................. 235/50 R |
| 3,240,409 | 3/1966 | Harris ............................. 235/50 R |
| 3,772,754 | 11/1973 | Stephens .................... 29/243.58 X |
| 4,297,566 | 10/1981 | Ahmann ......................... 235/50 R |
| 4,488,034 | 12/1984 | Stephens et al. ................ 235/50 A |
| 4,504,735 | 3/1985 | Thayne ........................... 235/50 A |

Primary Examiner—Michael L. Gellner
Assistant Examiner—Eddie C. Lee
Attorney, Agent, or Firm—Emrich & Dithmar

[57] ABSTRACT

A data recorder includes a unitary housing such as comprised of a molded plastic having an open upper portion, a removable lower cover, and a data card receiving arrangement at one end thereof. The data card receiving arrangement includes a narrow slot of precisely fixed dimensions for preventing the insertion of more than one data card at a time. Disposed within the housing are various flat template members arranged in a layered array, with each template having a plurality of spaced apertures therein. Upon full insertion of a data card in the data recorder, the leading edge of the card urges a forward-biased mask member to the full aft position for aligning the apertures of the various layered members allowing the tip of a stylus to be inserted through aligned apertures in the mask and template members to permit severing of chips or punch portions from the data card, which may be either scored or unscored. The recorder includes a seal/lock arrangement and means for removing a hung-up card without disassembling the recorder. Several telescoping stylus designs are contemplated, one employing a trigger mechanism which activates a pointed, inner telescoping member when a predetermined force is manually applied to the stylus, causing the inner member to pierce the data card and remove a chip therefrom in a manner which provides an aural and tactile indication to the user that the data card has been punched.

18 Claims, 6 Drawing Sheets

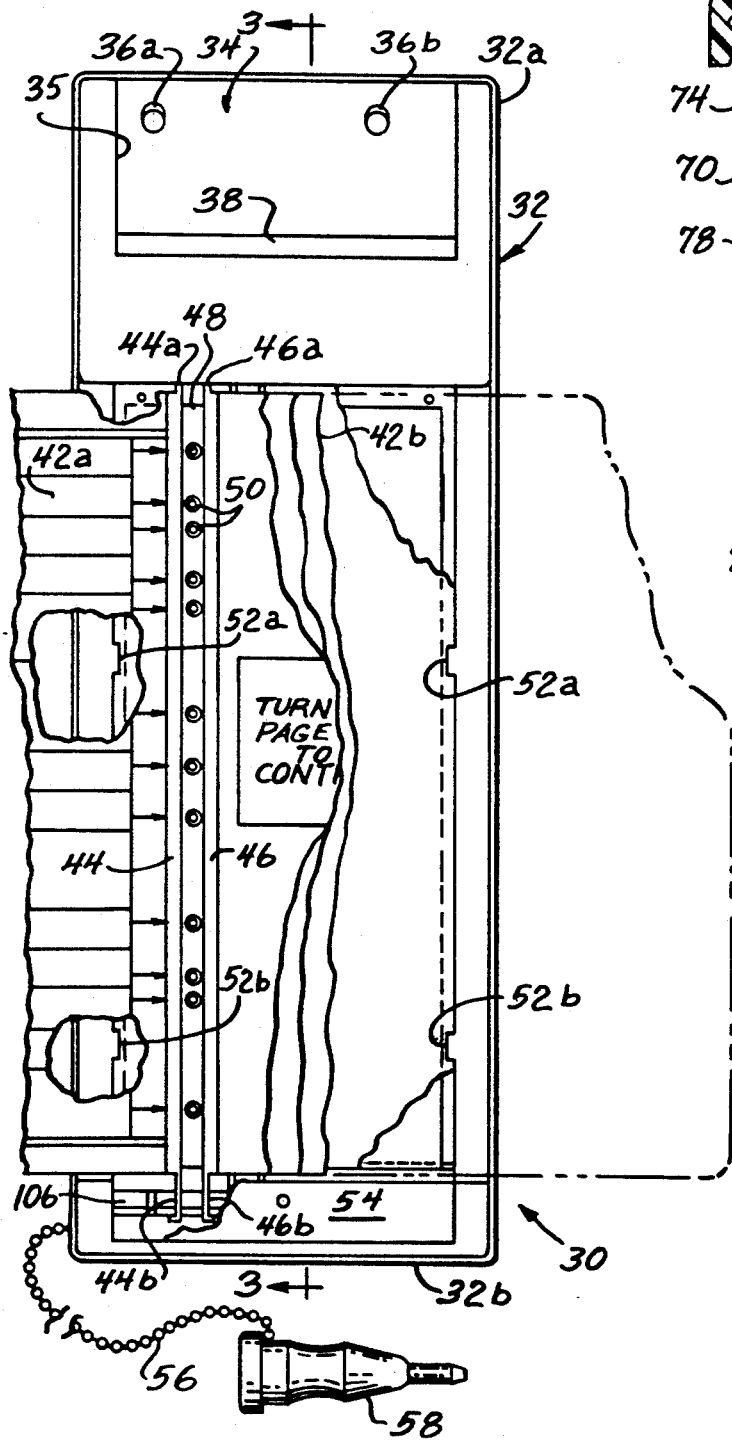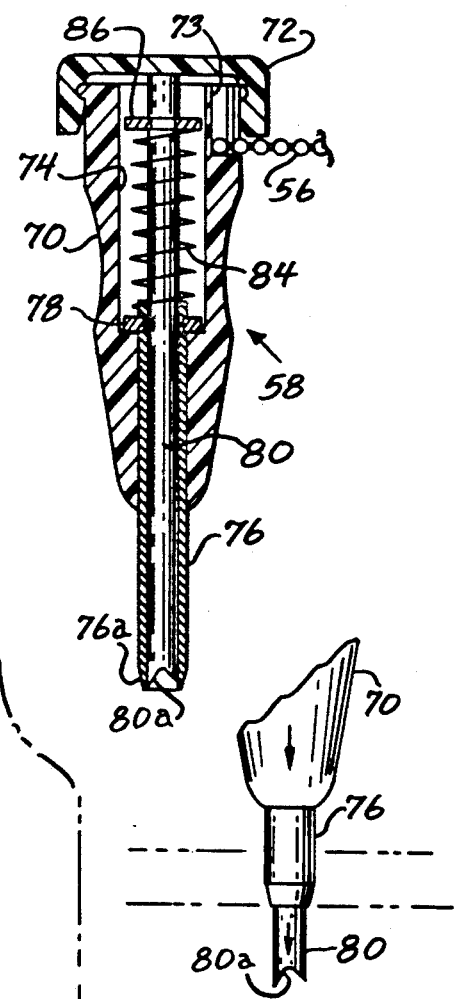

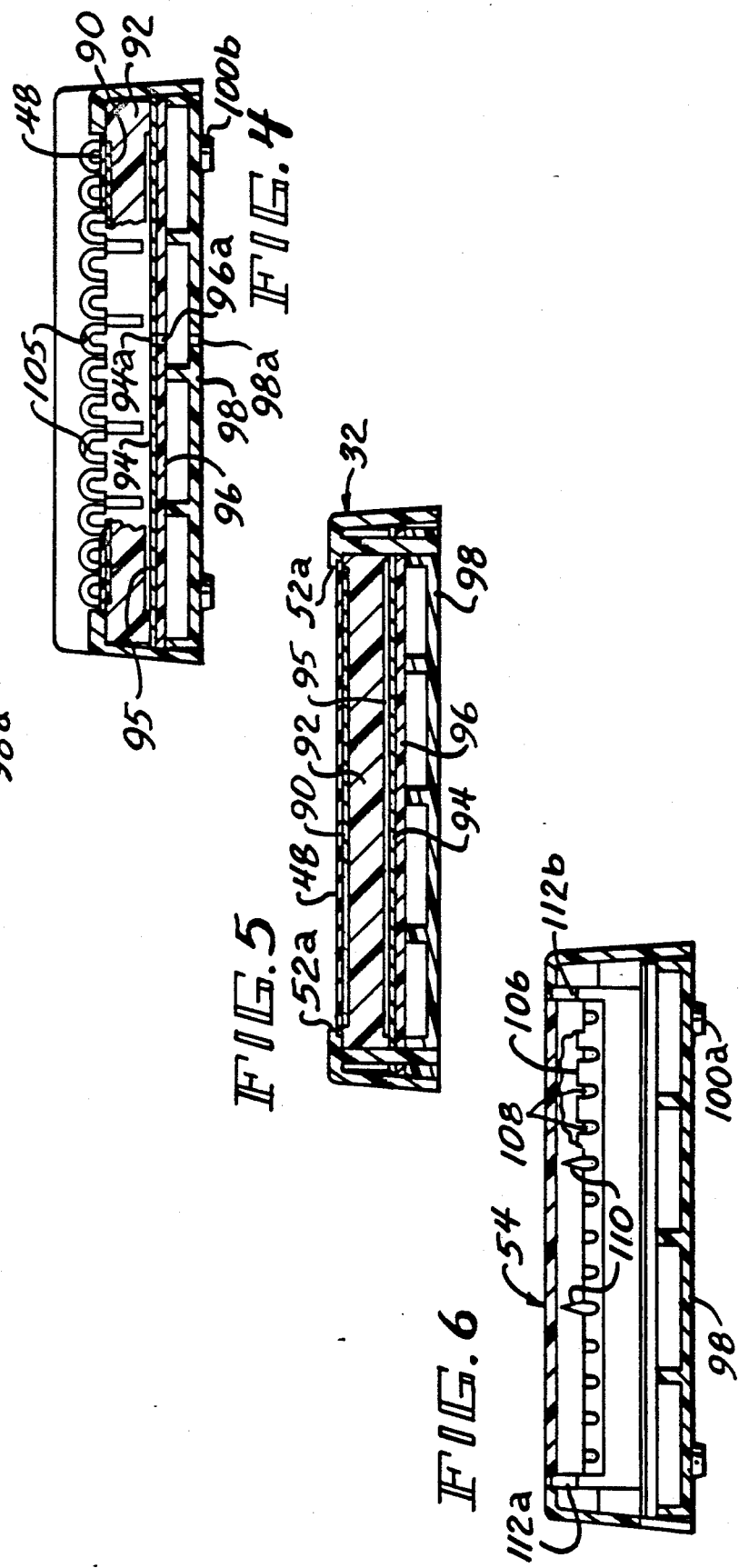

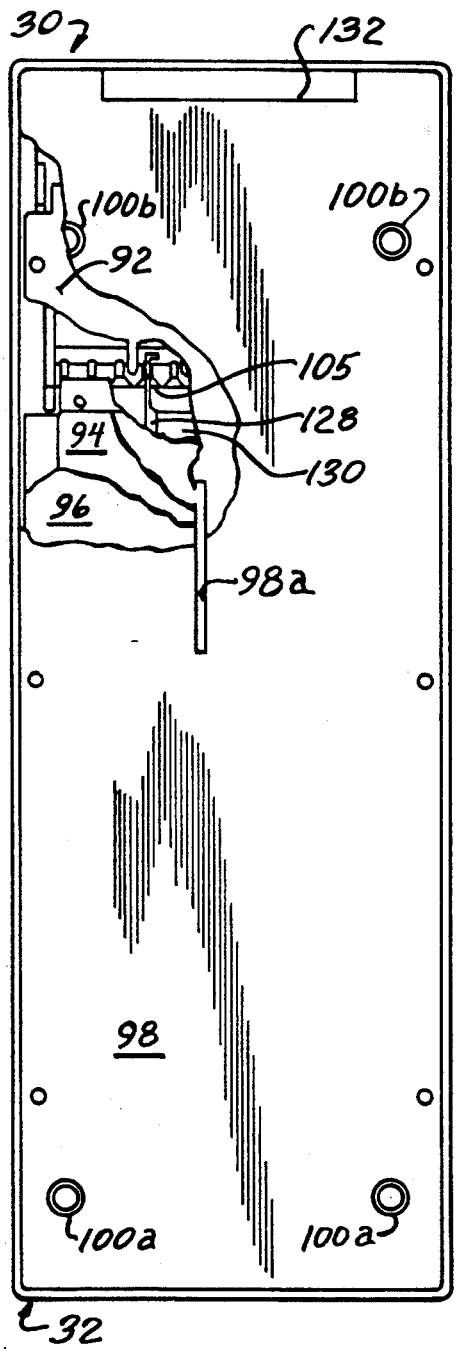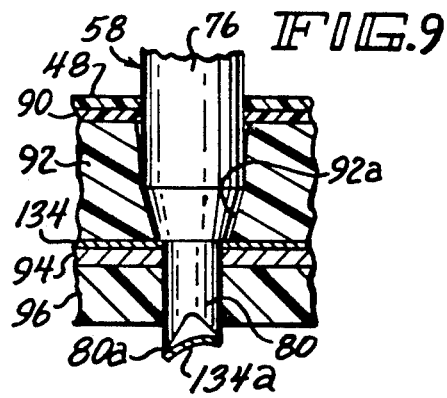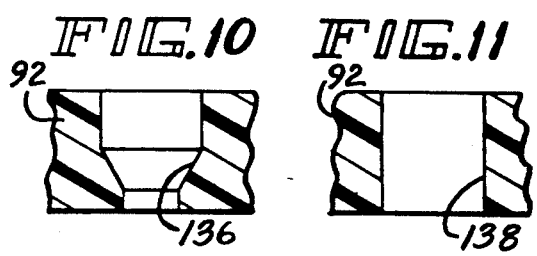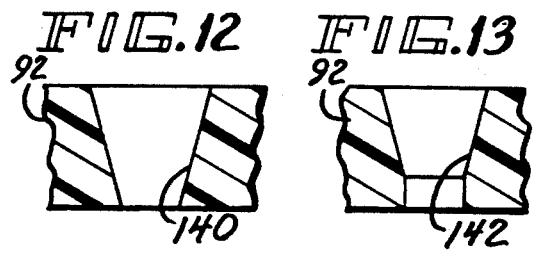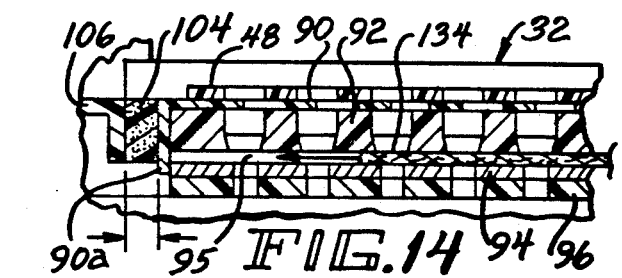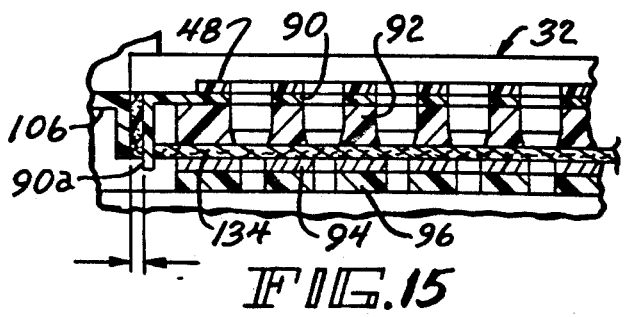

DATA RECORDER AND STYLUS THEREFOR

This is a continuation of U.S. patent application Ser. No. 07/387,519, filed Jul. 28, 1989 now abandoned.

BACKGROUND OF THE INVENTION

This invention relates generally to the entry and recording of data on a card, and apparatus therefor, and is particularly directed to a data recording device and associated stylus for removing portions of a data card such as an election ballot.

Data, or information, is frequently recorded on cards by punching out, or removing, portions of the card at designated locations, each having associated therewith a given piece of information. Vote recorders are one example of such data recording apparatus. However, a wide range of data is so recorded in various fields such as in evaluation and testing, market surveys, census taking, meter reading, credit card processing, etc. Apparatus for entry of such information on data cards should be inexpensive, reliable and accurate, easy to use, re-usable, and adaptable to various applications and uses.

Present data recorders, particularly of the vote recorder type, generally include a housing into which a data card is inserted for aligning apertures in a plurality of stacked templates permitting a stylus to be inserted in the aligned apertures and through designated locations in the data card. Prior art data recorders generally include a multi-piece housing which must be assembled and securely coupled together during manufacture. Such assembly is generally done by hand and is thus expensive and difficult because of the tight tolerances specified. Failure to meet such tight tolerances frequently results in the hang-up of data entry cards in the apparatus which generally necessitates disassembly of the data recorder and removal of the torn or bent data card before the apparatus can be used again Also entering into the not insubstantial cost of present data recorders is the fabrication of a control mask having a unique array of apertures therein, as dictated by a particular data recording operation such as an election. Prior approaches to the fabrication of such control masks involve the use of large presses to stamp out the individual masks. This procedure is also costly and time consuming. Finally, there have been problems in the past in that prior data recorders have suffered from a failure of the punched out portion, or chip, of the data card to be completely separated when engaged by a stylus. One reason for this incomplete data entry is that the user cannot see the chip being removed and is not provided with confirmation that the data was properly entered.

The present invention is intended to overcome the aforementioned limitations of the prior art and to provide the various advantages described above. The data recorder of the present invention employs a housing of unitary construction and precise dimensions which is inexpensive, easily manufactured, and can be arranged in stacked arrays to facilitate handling and storage. The data recorder includes a tamper-proof feature and makes use of a unique stylus which provides the user with aural and tactile feedback as to the entry of data. The precise dimensions of the data recorder preclude the insertion of more than one data card at a time and it further includes the capability to remove a data card which has become hung-up in the recorder such as by tearing or bending without disassembly of or tampering with the recorder or breaking its security seal.

OBJECTS AND SUMMARY OF THE INVENTION

Accordingly, it is an object of the present invention to provide an improved data recording apparatus which is particularly adapted for vote entry and recording.

Another object of the present invention is to improve the reliability and accuracy of manual data recorders by eliminating the possibility of tampering with the recorder, preventing the insertion of more than one data card in the recorder at one time, and facilitating the removal of a damaged or stuck data card without modification to or disassembly of the recorder.

A further object of the present is to provide a data recording apparatus of unitary construction which is inexpensive and which requires only limited manual assembly.

Yet another object of the present invention is to provide a control mask for a data, or vote, recorder which is of limited thickness and thus amenable to be automatically punched with apertures under computer control using a keypunch and a standard size data entry card.

A still further object of the present invention is to provide a vote recording device which is compact, of unitary construction and high strength, and which can be stacked one upon another to facilitate handling and storage.

It is another object of the present invention to provide an improved stylus for the entry of data in a punched-out type of data card which affords an aural and tactile indication of data entry.

Another object of the present invention is to allow for the removal of a data card which has become stuck in a secure data recording apparatus without breaking its security seal.

It is also an object of the present invention to allow for the insertion in a data recorder of pages relating to the entry of data on a data card in a right side up orientation as well as in the order in which the pages are to be used.

The present invention contemplates an apparatus for recording data on a data card by removing portions of said data card with a stylus, the apparatus comprising a unitary housing including an open upper portion and first and second end portions; positioning means in the housing for receiving a page containing information relevant to the entry of data; tamper-proof means coupled to the housing adjacent the second end thereof and cooperating with the positioning means for preventing removal of the page from the housing; data card receiving means disposed within and adjacent to the first end of the housing and including an elongated, linear slot for receiving a data card inserted in the housing in a sliding manner, wherein the slot is precisely dimensioned so as to prevent simultaneous insertion of more than one data card in the housing; a plurality of generally flat, fixed templates arranged in a stacked array in the housing below and in alignment with the open upper portion thereof, wherein each of the templates includes a plurality of spaced apertures with the apertures of adjacent templates in common alignment; and a movable template having a plurality of spaced apertures and disposed in the stacked array of fixed templates above the data card, wherein the movable template is adapted for engagement by a data card inserted in the housing and is linearly displaced thereby so that its apertures are aligned with the apertures of the fixed templates permitting the stylus to be inserted in the aligned apertures and through a designated portion of a data card in alignment with the apertures.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a top plan view shown partially cutaway of a data recorder in accordance with the principles of the present invention;

FIG. 2 is a sectional view of a stylus for use in entering data in the data recorder of FIG. 1;

FIG. 2a illustrates details of the point of the stylus of FIG. 2 in the extended position;

FIG. 3 is a sectional view of the data recorder of FIG. 1 taken along sight line 3—3 therein;

FIG. 4 is a sectional view of the data recorder of FIG. 3 taken along sight line 4—4 therein;

FIG. 5 is another sectional view of the data recorder of FIG. 3 taken along sight line 5—5 therein;

FIG. 6 is yet another sectional view of the data recorder of FIG. 3 taken along sight line 6—6 therein;

FIG. 9 is a lateral sectional view showing a stylus inserted through various apertured templates in the data recorder of the present invention;

FIGS. 10 through 13 are sectional views of various aperture shapes for receiving a stylus tip in accordance with the present invention;

FIGS. 14 and 15 are sectional views respectively illustrating the relative position of the various layered templates in the vote recorder without and with a data card inserted in the recorder apparatus;

FIG. 16 is bottom plan view shown partially cutaway of the data recorder of the present invention;

DETAILED DESCRIPTION OF THE PREFERRED EMBODIMENTS

Figure 7:
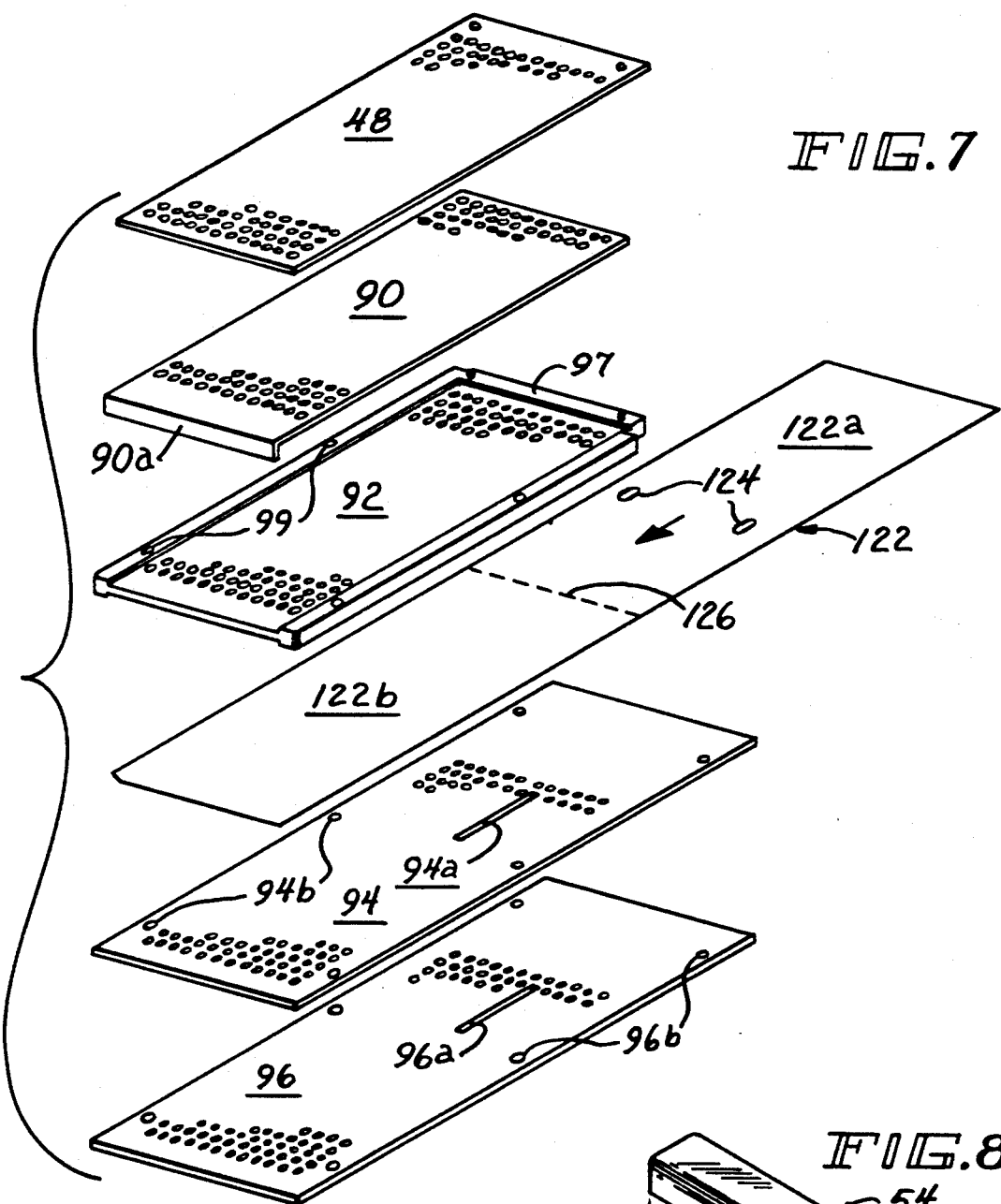
FIG. 7 is an exploded perspective view of the various apertured templates arranged in a stacked array in the vote recorder of the present invention, including a data card inserted therebetween.

Referring to FIG. 1, there is shown a partially cutaway top plan view of a data, or vote, recorder 30 in accordance with the principles of the present invention. FIG. 3 is a sectional view of the inventive data recorder 30 of FIG. 1 taken along sight line 3—3 therein. Additional sectional views of the data recorder 30 are shown in FIGS. 4, 5 and 6 which are respectively taken along sight lines 4—4, 5—5, and 6—6 in FIG. 3.

As shown in the aforementioned figures, the data recorder 30 includes a generally rectangular housing 32 which is comprised of a single, unitary structure preferably of a high strength, molded plastic. The housing 32 includes a head end 32a and a foot end 32b. The head end 32a includes a data card, or voting ballot, receiving arrangement 34. The card receiving arrangement 34 is integrally molded in the unitary structure of the housing 32 and includes a tapered opening 38 in an upper portion of the housing adjacent to its head end 32a. The tapered opening 38 is adapted to receive a data card (not shown) inserted into the opening in the direction of the arrow shown in FIG. 3. The tapered opening 38 is wide at the top and narrows to a longitudinal opening, or slot, 38a in the housing 32. Disposed within the recessed portion 35 in a spaced manner are first and second projections 36a, 36b which are adapted for insertion in respective apertures in a data card for maintaining the data card in position within the data recorder 30 during data entry.

An open, upper portion of the housing 32 is adapted to receive a plurality of sheets, or pages, 42a and 42b. These pages generally include information relevant to the entry of data on a data card inserted in the data recorder 30. Page 42a is securely attached along one of its edges to a first elongated card receiving member 44 such as by crimping of the card receiving member. Similarly, page 42b is attached along one of its edges to a second card receiving member 46. Each of the first and second card receiving members 44, 46 includes a respective first end 44a and 46a adapted for insertion into a tapered aperture 105 within the unitary housing 32. Positioned in the foot end 32b of the housing 32 is a cross member 106 which extends the width of the housing and includes a plurality of spaced positioning slots 108 in an upper portion thereof. Each of the positioning slots 108 is adapted to receive a second end portion of each of the card receiving members. Thus, second ends 44b and 46b of the first and second elongated card receiving members 44, 46 are each positioned in a respective one of the positioning slots 108 within the cross member 106. With one end of a card receiving member positioned within one of the aforementioned tapered apertures 105 and its other end positioned within one of the aforementioned positioning slots 108, a receiving member and a data card attached thereto are securely maintained in position within the data recorder 30 by means of a security clip 54 inserted in the foot end 32b of the housing 32 as described in detail below. Thus positioned in the data recorder 30, the elongated linear receiving member is freely pivotable allowing its associated page to be turned as in a book. This arrangement for installing the pages in the data recorder 30 allows the pages to be inserted right side up and in the order in which the pages are to be used rather than right side down and in reverse order.

The data recorder 30 includes a plurality of generally flat, rectangular plates, each having a plurality of spaced apertures therein, arranged in a generally stacked array within the housing 32. An exploded view of these various apertured plates is shown in FIG. 7, while aforementioned FIGS. 1 through 6 show the arrangement of these components in an assembled data recorder. The top plate is a control mask 48 which is positioned within the opening in the upper portion of the housing 32 and is maintained therein by means of a plurality of retaining flanges 52a and 52b extending inwardly from the housing so as to engage and retain the control mask within the housing. The control mask 48 includes a plurality of spaced apertures 50 as shown in FIG. 1 which uniquely match the entries, or information, on the pages 42a and 42b to ensure that data entered in the data recorder 30 is properly marked on a data, or record, card 122.

The control mask 48 is adapted for positioning upon and coupling to an upper template 92. The upper template 92 also includes a plurality of spaced apertures therein as well as a flange 97 disposed about three edges thereof. The template's flange 97 includes a plurality of spaced apertures 99 therein. The lower surface of the control mask 48 is provided with plurality of spaced mounting pins (not shown) adjacent to the periphery thereof. Each of these mounting pins is adapted for insertion within a respective aperture 99 within the upper template's flange 97. The control mask's mounting pins provide a fixed coupling between the control mask 48 and the upper template 92 and prevent relative movement therebetween. Because the upper template's flange 97 is thicker than the upper template 92 itself, a space is provided between the upper template and the control mask 48. Positioned within this space is a movable mask 90 also having a plurality of spaced apertures therein as well as an end portion 90a which extends downward and is positioned adjacent to the flangeless edge of the upper template 92.

Disposed immediately below the upper template 92 is an anvil 94 in the form of a metal plate also having a plurality of spaced apertures therein. Disposed about the periphery of the anvil 94 in a spaced manner are a plurality of alignment apertures 94b. Each of the anvil s alignment apertures 94b is adapted to receive a respective alignment pin (not shown) extending from a lower portion of the upper template's peripheral flange 97. With the thickness of the peripheral flange 97 greater than that of the upper template 92, a gap, or slot, 95 is maintained between the upper template and the anvil 94 permitting a data card 122 to be inserted therebetween. The data card 122 generally includes a first portion 122a having a pair of apertures 124 therein and a second portion 122b upon which the data is entered. A perforated line 126 separates the two card portions to facilitate their separation.

Positioned immediately below and in contact with the anvil 94 is a lower support template 96 which also includes a plurality of spaced apertures therein. The lower support template 96 further includes around its periphery a plurality of spaced alignment apertures 96b, each of which is adapted to receive and engage a respective one of the alignment pins extending downward from the upper template's peripheral flange 97. The alignment pins extending from the upper template's peripheral flange 97 thus connect the upper template 92, the anvil 94 and the lower support template 96 in a fixed manner and prevent relative movement therebetween.

A lower portion of the housing 32 is adapted to receive a bottom cover 98. The bottom cover 98 is securely attached to the housing 32 in a snap-acting manner in a preferred embodiment, but may also be attached by conventional means such as screws inserted through apertures in the bottom cover. Disposed on the bottom cover are a plurality of support feet 100a, 100b. The foot end 32b of the housing 32 is provided with a slot 102 adapted for receiving and engaging a chain 56 to which a stylus 58 is attached for attaching the stylus to the data recorder 30.

The data recorder 30 of the present invention operates in the following manner to receive and allow for the entry of data in the form of severed chips or punch portions in a data card. A data card is inserted edge first into the tapered opening 38 in the housing 32 in the direction of the arrow shown in FIG. 3. The longitudinal slot 38a is sufficiently narrow to permit the insertion of only a single data card in the gap, or slot, 95 between the upper template 92 and the anvil 94. For example, for use with data cards having a thickness of 0.007 inch, the longitudinal slot would preferably be provided with a depth of 0.013 inch or less. Because the housing 32 is formed of a unitary structure, precise production tolerances may be maintained in the dimensions of the longitudinal slot 38a.

With reference also to the sectional views of FIGS. 14 and 15, continued insertion of a data card 134 along the gap 95 will cause a leading edge of the data card to engage the end portion 90a of the movable mask 90. Continued displacement of the data card 34 will cause a corresponding displacement of the movable mask 90. Disposed between the end portion 90a of the movable mask 90 and a cross-member 106 of the frame 32 located in its foot end 32b, is a mask biasing element 104, preferably comprised of sponge rubber, but which may also be a metal or plastic spring. A portion of the resilient biasing element 104 also engages an inner portion of the foot end of the recorder's housing which is not shown in these figures. The biasing element 104 urges the movable mask 90 toward the head end 32a of the housing 32. Prior to displacement of the movable mask 90 by the data card 34, the apertures within the movable mask are not in alignment with corresponding apertures in the immediately adjacent control mask 48 and upper template 92 as shown in FIG. 14. Upon displacement of the movable mask 90 by the data card 134 and with the mask biasing element 104 fully compressed as shown in FIG. 15, the apertures in the movable mask are aligned with the apertures in the control mask 48 and upper template 92. When the data recorder 30 is assembled, the apertures in the control mask 48, the upper template 92, the anvil 94, and the lower support template 96 are in mutual alignment. This arrangement insures that a card engaging element, such as a stylus, cannot be inserted through the apertures in the various templates above and below the data card 134 until the data card is fully inserted in the data recorder and designated portions of the data card are in alignment with these apertures. This eliminates the possibility of erroneous data entries arising from incomplete insertion of the data card in the data recorder. Once fully inserted in the data recorder 30, a pair of apertures 124 in the data card 122 are adapted to receive the projections 36a and 36b to maintain the data card in proper position against the force of the biasing element 104.

The unitary housing 32 of the present invention, which is preferably comprised of a single piece of molded plastic, allows for a reduction in size of the data recorder over prior art approaches and an improvement in the dimensional tolerances of the recorder. As such, a preferred embodiment of the present invention makes use of computer-sized data cards of the IBM type which are on the order of $7\frac{3}{8}$ inches long and $3\frac{1}{4}$ inches wide. Control masks of this same general size are contemplated for use in such dimensioned data recorders. By matching the size of the control mask with a standard computer-type data card, the spaced apertures may be incorporated in the control mask by an automatic punching procedure under the control of a computer rather than by means of a large punch press as is the current practice. Computer control fabrication of the control mask substantially reduces the time and cost to produce these control masks which are uniquely configured for a given data recording operation such as for a particular election.

The reduced size of the data recorder's housing as well as its unitary and precisely dimensioned construction also facilitates arranging the data recorders of the present invention in neatly stacked arrays for storage and handling. The compact shape of the inventive data recorder allows it to incorporate generally flat upper and lower surfaces for improved stacking stability. The aforementioned support feet of an upper data recorder are spaced so as to be positioned within the open upper portion of a lower data recorder arranged in a stacked array. Facilitating the handling and storage of the data recorder as well as reducing its size allows large numbers of data recorders to be easily used in a wide variety of applications to collect and store large quantities of data.

Referring to FIGS. 3, 4, 7 and 16, which is a partially cutaway bottom plan view of the inventive data recorder 30, it can be seen that the apertured templates positioned beneath the data card 122 within the data recorder are each provided with respective aligned, elongated slots. Thus, the anvil 94 and the lower support template 96 are each provided with respective elongated aligned slots 94a and 96a. In addition, the bottom cover 98 also includes an elongated, linear slot 98a which is aligned with and disposed immediately below the two aforementioned slots in the anvil 94 and the lower support template 96. These aligned slots permit the insertion of a thin element (which is not shown in the figures for simplicity) into a lower portion of the housing 32 of the data recorder 30 for engaging and displacing a data card which has become wedged, or jammed, in the data recorder and cannot be withdrawn therefrom via the tapered opening 38. These slots allow for the withdrawal of a data card which is stuck in the data recorder without disassembling or otherwise modifying the data recorder. Also as shown in FIG. 16, the bottom cover 98 includes a recessed edge portion 132 adjacent the head end of the housing 32 to facilitate disposal of chips removed from a data card.

Figure 8:
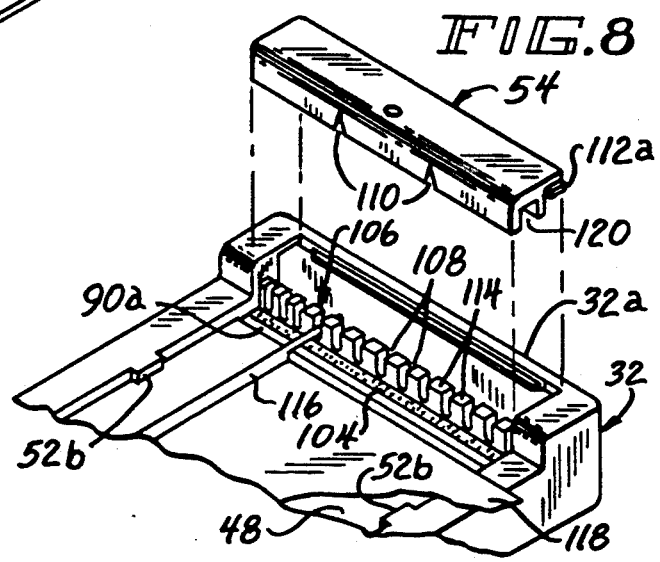
FIG. 8 is an exploded perspective view of an end portion of the data recorder of the present invention illustrating details of its tamper-proof structure.

With reference also to FIGS. 6 and 8, details of the manner in which the control mask 48 as well as the aforementioned pages 42a, 42b are maintained in the vote recorder housing in a secure, tamper-proof manner will now be described. With the control mask 48 inserted within the housing 32, one end of a card receiving member 116 is inserted in one of the aforementioned tapered apertures 105 in the head end portion 32a of the housing 32, with the other end of the card receiving member inserted in a positioning slot 108 within the cross-member 106. Cross-member 106 is integral with the housing 32 and includes a plurality of spacers 114 between which are disposed the aforementioned positioning slots 108. As shown in FIG. 8, the mask biasing element 104 is disposed between the movable mask's end portion 90a and the cross-member 106 and foot end 32a of the recorder's housing 32. With the card receiving member 116 positioned within a positioning slot 108, a security clip 54 is inserted in the housing 34. The security clip 54, which is preferably comprised of a high strength plastic, includes a pair of slots 110, a pair of locking tabs 112a, and an elongated lower recess 120.

With the security clip 54 in position in the housing 32, the spacers 114 are positioned within the security clip's elongated lower recess 120 and the locking tabs 112a and 112b are positioned beneath and engaged by an upper portion of the housing 32. The security clip 54 is inserted in the housing 32 in a snap-acting manner and cannot be removed from the housing without breaking the locking tabs 112a, 112b. By forming the security clip 54 from a high strength plastic and by minimizing the length of the locking tabs 112a, 112b, the data recorder 30 is essentially tamper-proof such that the removal of the control mask 48 or the pages 42a, 42b is precluded. The pair of slots 110 on the lower edge of the security clip 54 allow it to flex slightly to facilitate its insertion in the housing 32.

Referring to FIG. 2, there is shown a stylus 58 for use with the data recorder of the present invention. The stylus 58 includes a housing 70 which is open at both ends and includes a center slot 74 therethrough. The housing 70 also includes an elongated notch 73 adapted for receiving and engaging a chain 56 attached to the data recorder. One end of the housing 70 is adapted to receive and securely engage in a snap-acting manner a cap 72. The cap 72 may also be attached to the housing 70 by threaded engagement. Disposed within the housing 70 in a fixed manner and extending substantially the length of the housing's center slot 74 is a fixed shaft 80. The shaft 80 has a distal end 80a having one or more sharp edges thereon. Affixed to the shaft 80 adjacent to the proximal end thereof is a first shoulder 86. A movable outer tube 76 is disposed about the fixed shaft 80 and is movable along the length thereof. The outer tube 76 is also movable in a telescoping manner into and out of the housing 70. Attached to a proximal end of the outer tube 76 is a second shoulder 78. A coil spring 84 is disposed about the fixed shaft 80 and in contact with the first and second shoulders 86, 78.

With the tapered tip 76a of the outer tube 76 in contact with a fixed object having an aperture therein, downward displacement of the combination of the housing 70 and fixed shaft 80 causes the sharp edged distal end 80a of the fixed shaft to extend out of and beyond the tube 76 as shown in FIG. 2a. By providing an apertured template located above the data card with a tapered aperture, the stylus 58 shown in FIGS. 2a and 2b may be used to punch out chips from the data card by downward displacement of the housing 70 and shaft 80 permitting the shaft tip 80a to engage the data card and remove a chip therefrom.

Such an arrangement is shown in FIG. 9. The outer tube 76 of the stylus 58 is inserted through the control mask 48, the movable mask 90, and the upper template 92. The upper template 92 is provided with a tapered aperture 92a which permits the outer tube 76 to be inserted in the upper template, but limits further downward displacement of the outer tube of the stylus. Upon further displacement of the stylus housing (not shown in FIG. 9), the fixed shaft 80 will extend outward from the outer tube 76 allowing its sharp edged tip 80a to pierce a data card 134 and remove a chip 134a therefrom. The anvil 94 and the lower support template 96 are each provided with aligned apertures which are smaller than those in the control mask 48, the movable mask 90, and the upper template 92. As shown in FIG. 9, all of the aforementioned apertures are in vertical alignment facilitating insertion of the stylus and insuring removal of a chip from the proper location in the data card.

FIGS. 10 through 13 illustrate various alternative arrangements for apertures within the upper template 92. In FIG. 10, the tapered aperture 136 includes several shoulders configured in accordance with the tip of the stylus. The lower end of the tapered aperture 136 is dimensioned so as to allow insertion of the inner shaft of the stylus, but to prevent further downward displacement of its outer tube. The tapered aperture 140 of FIG. 12 is defined by a smooth bore within the upper template 92. The tapered aperture 142 in FIG. 13 includes a single shoulder in accordance with the shape of the tip of its associated stylus. Finally, the aperture 138 in FIG. 11 is not tapered and allows the insertion of both the outer tube and inner shaft of the stylus. Continued displacement of the outer tube of the stylus is limited by a data card and apertured template disposed immediately below the data card (both of which are not shown in the figure), which allows for continued downward displacement of the stylus inner shaft which engages and pierces the data card in removing a chip therefrom.

Figure 17:
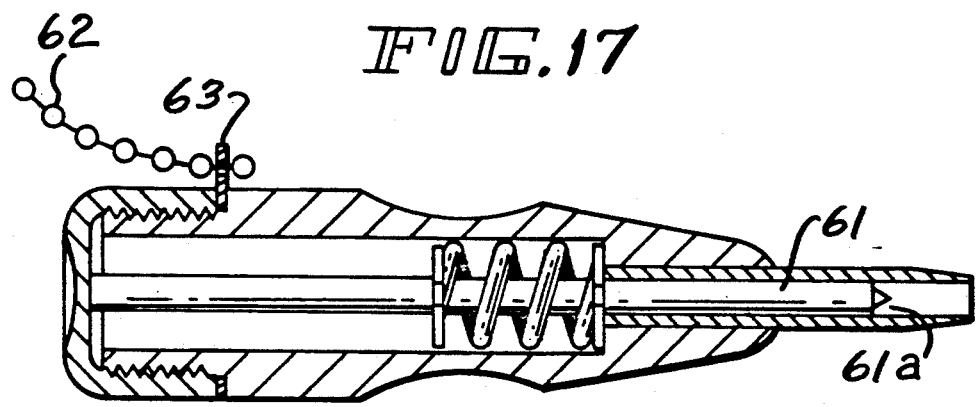
FIGS. 17 through 19 are sectional views of various telescoping stylus arrangements for use with the data recorder of the present invention.
Figure 18:
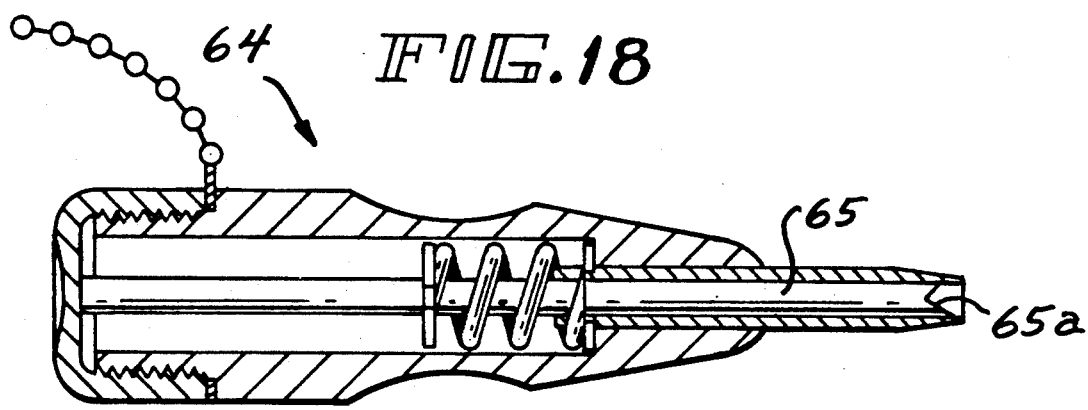
Figure 19:
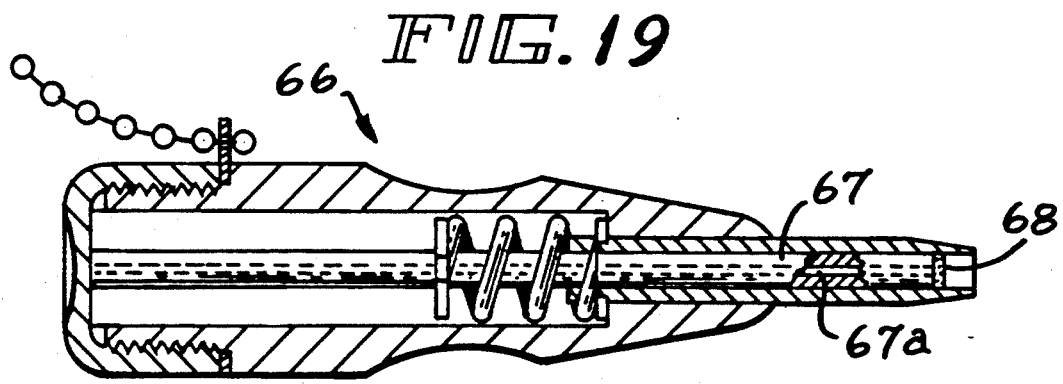

Referring to FIGS. 17, 18 and 19, there are shown various versions of a stylus similar to that illustrated in FIG. 2 and discussed above. The styluses shown in FIGS. 17, 18 and 19 differ from the stylus illustrated in FIG. 2 in the record card engaging portion thereof. For example, stylus 60 shown in FIG. 17 includes a tip 61a on the distal end of the fixed shaft 61 having a concave-shaped portion positioned around a conically-shaped center portion with a sharp-edged periphery. This stylus 60 is disclosed and claimed in Applicants' U.S. Pat. No. 4,485,298, issued Nov. 27, 1984, and is particularly adapted for producing well defined, critically dimensioned, index slits in a record card by punching out prescored index portions thereof. A chain 62 is attached to the housing of stylus 60 by means of a swivel ring 63. The stylus 64 shown in FIG. 18 includes a fixed shaft 65 having a distal end 65a thereof formed by two angled surfaces forming facing sharp-edged corners on the fixed shaft. The stylus 66 shown in FIG. 19 is not adapted to cut out or sever a portion of a data card, but rather is of the self-inking type and includes a fixed shaft 67 having an ink-type stamp element 68 on the distal end thereof. The stamp-like element 68 is coupled to an ink-saturated wick 67a extending the length of the fixed shaft 67. Data is recorded with the stylus 66 by contacting a data card with the stamp-like tip 68 of the fixed shaft 67 so as to mark the data card.

Figure 20:
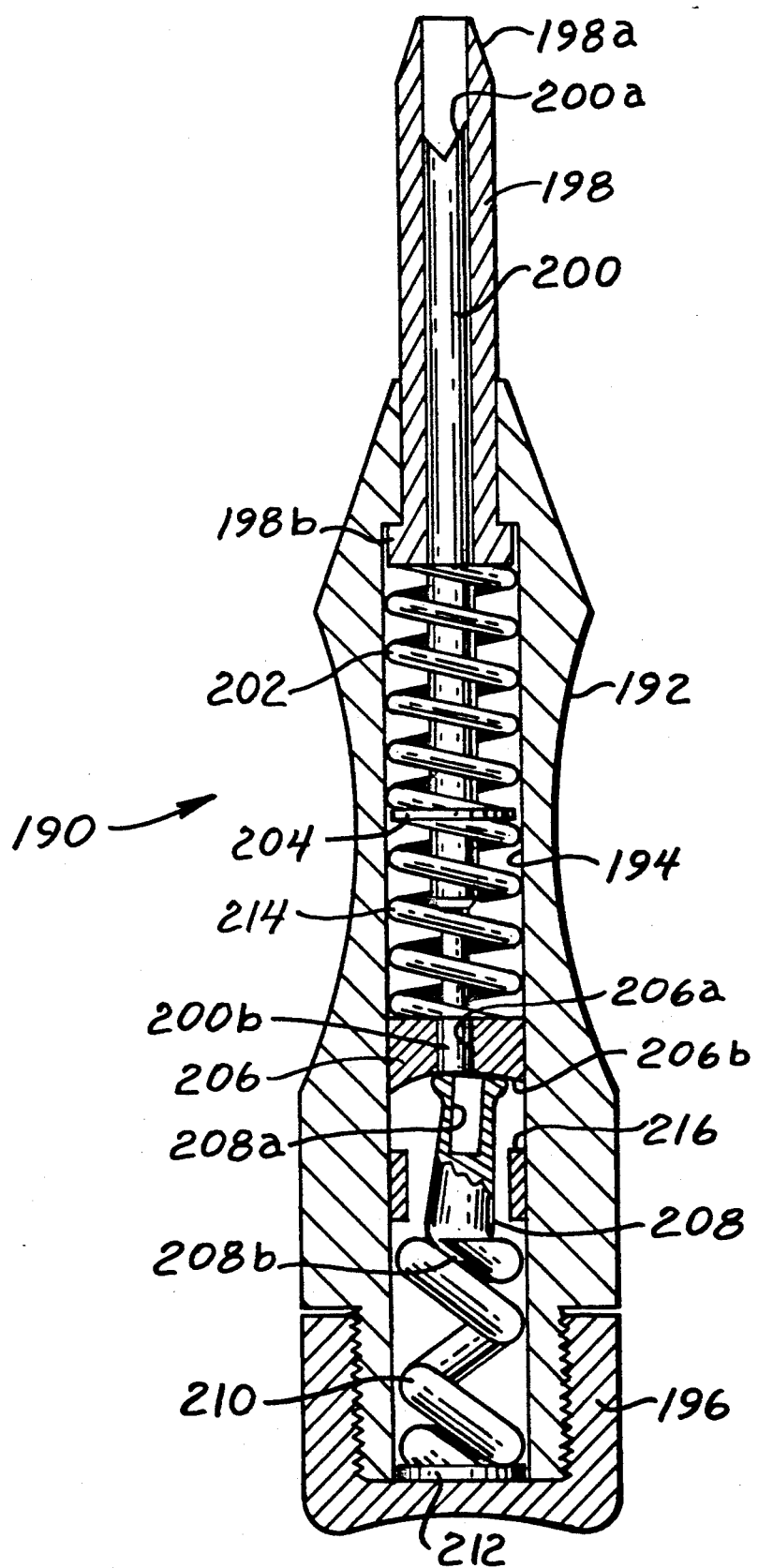
FIG. 20 is a sectional view of a telescoping stylus for use with the data recorder of the present invention which provides the user with an aural and tactile indication of the entry of data upon the punching out of a chip, or chad, from the data card.

Referring to FIG. 20, there is shown a sectional view of a self-centering, spring loaded stylus 190 for use in entering data on a card in accordance with the present invention. The stylus 190 includes a housing 192, having a center bore, or channel, 194 extending therethrough. A cap 196 is securely affixed to one end of the housing 192 such as by a conventional adhesive or in a snap-acting manner. Disposed within the bore 194 of the housing 192 and extending from an aperture in the housing is an outer tube 198 having a tapered distal end 198a. The outer tube 198 further includes a shoulder 198b on the proximal end thereof.

Disposed within and movable along the outer tube 198 is an inner shaft 200. The inner shaft 200 includes a sharp edged distal end 200a and a proximal end 200b of reduced diameter. Also disposed within the housing's bore 194 is a first spring stop 204 which is fixedly attached to the inner shaft 200. A first coil spring 202 is disposed between and in contact with the first spring stop 204 and the shoulder 198b of the outer tube 198 for urging the outer tube to an extended position within the housing 192. Also disposed within the housing's bore 194 is a guide washer 206 having a center aperture 206a and a curvilinear surface 206b. The proximal end 200b of the inner shaft 200 extends through the guide washer's aperture 206a and engages a quick retraction mechanism 208. The quick retraction mechanism 208 includes an elongated slot 208a on a first end thereof and a rounded second end 208b thereof. Positioned in contact with the rounded end 208b of the quick retraction mechanism 208 is a second coil spring 210 which is engaged by a second spring stop 212. The second spring stop 212 is in abutting contact with an inner portion of the cap 196. A third coil spring 214 is disposed between and in contact with the first spring stop 204 and the guide washer 206 and urges the guide washer away from the first spring stop. An inner sleeve 216 is fixedly attached to an inner portion of the housing 192 between the guide washer 206 and the second coil spring 210.

The stylus 190 operates in the following manner to provide a user with a tactile and aural indication of extension of the inner shaft 200 from the outer tube 198 and the entry of data on a data card by punching out a portion thereof. Initially the tapered end 198a of the outer tube 198 is inserted in the tapered aperture of a template positioned immediately adjacent to a data card (neither of which are shown in the FIG. 4 for simplicity).

Displacement of the housing 192 by a user toward the engaged template causes compression of the first coil spring 202 and retraction of the outer tube 198 into the housing 192. This displacement of the housing 192 also forces the quick retraction mechanism 208 into intimate contact with the adjacent end of the second coil spring 210, which is then compressed between the quick retraction mechanism and the second spring stop 212. The first spring 204 is provided with greater tensile strength and is thus stiffer than the second spring 210. Thus, movement of the housing 192 relative to the outer tube 198 results in greater compression in the second coil spring 210 than in the first coil spring 202. The third coil spring 214 urges the curvilinear surface 206b of the guide washer 206 into intimate contact with an end of the quick retraction mechanism 208.

The curvilinear surface 206b of the guide washer 206 engaging an end of the quick release mechanism 208 is shaped so as to maintain the quick retraction mechanism in an off-center orientation so that its longitudinal axis is not aligned with the inner shaft 200 as shown in FIG. 20. Upon compression of the second coil spring 210, the curvilinear surface 206b of the guide washer 206 urges the quick retraction mechanism 208 in alignment with the inner shaft 200. Continued displacement of the housing 192 relative to the outer tube 198 causes the displacement of guide washer 206 so that it is positioned in abutting contact with the inner sleeve 216. When this occurs, the quick retraction mechanism 208 is aligned with the inner shaft 200. With the quick retraction mechanism 208 aligned with the inner shaft 200, the proximal reduced end 200b of the inner shaft 200 is aligned with and suddenly thrust into the elongated slot 208a within the quick retraction mechanism. This sudden displacement of the inner shaft 200 and its contact with an inner portion of the quick retraction mechanism 208 provides the user with a tactile and aural indication that the first and second springs 202, 210 are fully compressed and that further displacement of the housing 192 will result in extension of the inner shaft 200 from the outer tube 198 so as to sever a chip from a data card in entering data thereon.

There has thus been shown a data recording apparatus and stylus therefor having a unitary housing which is compact, does not require assembly, is adapted for arrangement in stacked arrays to facilitate handling and storage, and which is precisely dimensioned for more reliable and accurate data entry. The data recording apparatus further includes secure means coupled to the housing for preventing removal of recorder components and associated pages related to the entry of the data. The inventive data recorder is adapted for use with variously configured stylus arrangements and includes tapered apertures in stacked templates for self-centering positioning of the stylus and more accurate entry of data. One stylus contemplated for use with the present invention provides the user with a tactile and aural indication of data card engagement by the stylus and removal of a chip from the card in entering data thereon.

While particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. Apparatus for recording data on a data card by removing portions of said data card with a stylus, said apparatus comprising:
    a unitary housing having an open upper portion and first and second end portions, said housing including:
        positioning means integral with said housing for receiving at least one page containing information relevant to the recording of data on the data card;
        data card receiving means integral with said housing and disposed adjacent to the first end thereof and including an elongated, linear slot for receiving the data card inserted in said housing in a sliding manner, wherein said slot is precisely dimensioned so as to prevent insertion of more than one data card in said housing;
    a plurality of generally flat, fixed templates arranged in a stacked array in said housing below and in alignment with the open upper portion thereof, wherein each of said templates includes a plurality of spaced apertures and wherein the apertures of adjacent templates are in common alignment; and
    a movable template disposed in said stacked array of fixed templates and having a plurality of spaced apertures, wherein said movable template is adapted for engagement by the data card inserted in said housing and is linearly displaced thereby so that the apertures of said movable template are aligned with the apertures of said fixed templates permitting the stylus to be inserted in said aligned apertures and through a designated portion of the data card in alignment with said apertures.

2. The apparatus of claim 1 wherein said unitary housing is comprised of a single piece of molded plastic.

3. The apparatus of claim 1 wherein said housing further includes retaining means disposed about the open upper portion of said housing for maintaining said templates in position within said housing.

4. The apparatus of claim 3 wherein said retaining means includes a plurality of retaining flanges disposed about and extending into the open upper portion of said housing.

5. The apparatus of claim 1 wherein said data card receiving means includes a recessed portion within said housing extending from an upper portion thereof and terminating in said elongated, linear slot to permit engagement of said data card with said movable template.

6. The apparatus of claim 5 wherein said recessed portion of said housing is tapered from the upper portion of said housing to said elongated, linear slot.

7. The apparatus of claim 5 further comprising data card retaining means disposed within the recessed portion of said housing.

8. The apparatus of claim 7 wherein the data card has at least one aperture therein and wherein said data card retaining means includes at least one projection extending from the recessed portion of said housing and adapted for insertion through the aperture in the data card.

9. The apparatus of claim 1 further comprising a plurality of support means disposed on a lower portion of said housing.

10. The apparatus of claim 9 wherein said support means includes a plurality of support feet disposed on a lower portion of said housing in a spaced manner so as to fit within an open upper portion of the housing of a second apparatus for recording data to permit said apparatus to be arranged in a stacked array.

11. The apparatus of claim 1 wherein said positioning means includes an elongated, linear page receiving member coupled adjacent to respective ends thereof to said housing.

12. The apparatus of claim 11 wherein said positioning means further includes a tapered aperture adapted to receive a first end of said page receiving member and a slot adapted to receive a second, opposed end of said card receiving member.

13. The apparatus of claim 12 wherein said tapered aperture and said slot are formed integrally with said housing.

14. The apparatus of claim 13 further comprising a plurality of tapered apertures and slots arranged in a pair of spaced, linear arrays for receiving a plurality of pages in said housing.

15. The apparatus of claim 1 further comprising data card access means for providing access to said data card in the even that said data card becomes jammed in said housing to facilitate removal of said data card from said housing.

16. The apparatus of claim 15 wherein said access means includes a plurality of aligned slots each disposed within a respective template permitting insertion of a data card engaging element so as to dislodge said data card and facilitate removal of said data card from said housing.

17. The apparatus of claim 1 including a security clip inserted in a snap-acting manner in said housing and including a plurality of locking tabs for engaging said housing and preventing removal of said clip from said housing, said security clip comprising a high strength, semi-rigid material and including a plurality of spaced slots therein allowing flexure of said security clip to facilitate installation of said security clip in said housing.

18. The apparatus of claim 1 wherein some of said templates are positioned above the data card and some of said templates are positioned below the data card, and wherein the apertures in those templates disposed above the data card are tapered for receiving a stylus having a tapered tip.

* * * * *

UNITED STATES PATENT AND TRADEMARK OFFICE
CERTIFICATE OF CORRECTION

PATENT NO. : 5,206,486
DATED : April 27, 1993
INVENTOR(S) : Richard J. Stephens and Harry H. Boucher It is certified that error appears in the above-identified patent and that said Letters Patent is hereby corrected as shown below:

IN THE CLAIMS

| COLUMN | LINE | |
|---|---|---|
| 12 | 55 | Delete "even" and insert -- event -- |

Signed and Sealed this

Twenty-eighth Day of December, 1993

Attest:

BRUCE LEHMAN

Attesting Officer

Commissioner of Patents and Trademarks